(12) United States Patent
Itou (10) Patent No.: US 11,132,823 B2
(45) Date of Patent: Sep. 28, 2021

(54) INFORMATION-PROCESSING DEVICE AND INFORMATION-PROCESSING METHOD

(71) Applicant: NTT DOCOMO, INC., Tokyo (JP)

(72) Inventor: Takurou Itou, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/469,290

(22) PCT Filed: Apr. 4, 2018

(86) PCT No.: PCT/JP2018/014488
§ 371 (c)(1),
(2) Date: Jun. 13, 2019

(87) PCT Pub. No.: WO2019/097740
PCT Pub. Date: May 23, 2019

(65) Prior Publication Data
US 2020/0286274 A1    Sep. 10, 2020

(30) Foreign Application Priority Data

Nov. 17, 2017   (JP) .............................. JP2017-222036

(51) Int. Cl.
G06T 11/60     (2006.01)
G06F 3/0484    (2013.01)
G06F 3/0488    (2013.01)

(52) U.S. Cl.
CPC .......... *G06T 11/60* (2013.01); *G06F 3/04842* (2013.01); *G06F 3/04845* (2013.01); *G06F 3/04886* (2013.01)

(58) Field of Classification Search
CPC combination set(s) only.
See application file for complete search history.

(56) References Cited

U.S. PATENT DOCUMENTS 6,037,936 A * 3/2000 Ellenby ................. G06F 3/0481
715/764
6,144,366 A * 11/2000 Numazaki ............... G06F 3/011
345/156

(Continued)

FOREIGN PATENT DOCUMENTS

JP    07-036438 A    2/1995
JP    07-044558 A    2/1995

(Continued)

OTHER PUBLICATIONS

International Search Report issued in corresponding PCT Application No. PCT/JP2018/014488 dated Jun. 19, 2018.

(Continued)

*Primary Examiner* — Motilewa Good Johnson
(74) *Attorney, Agent, or Firm* — MKG, LLC (57) ABSTRACT

Object display control unit causes an object to be displayed on display surface. Scroll instruction detecting unit detects an instruction to scroll the object displayed on touch-screen as a movement instruction. Gradation level setting unit sets a gradation level of the image displayed on display surface. Gradation level setting unit, when notified by scroll instruction detecting unit that a scroll instruction has been detected, reduces the gradation level of the image, for example, from a 256-gradation level to a 2-gradation level. Object display control unit converts the object represented by object data into an object expressed in the reduced gradation level, and causes the resultant object to be displayed.

18 Claims, 7 Drawing Sheets

(56) References Cited

U.S. PATENT DOCUMENTS

| | | | | |
|---|---|---|---|---|
| 6,215,912 | B1* | 4/2001 | Shiitani | G06F 3/04845 |
| | | | | 358/531 |
| 6,690,387 | B2* | 2/2004 | Zimmerman | G06F 3/04883 |
| | | | | 345/684 |
| 8,467,991 | B2* | 6/2013 | Khosravy | G06F 3/04883 |
| | | | | 702/153 |
| 9,041,727 | B2* | 5/2015 | Ubillos | G06F 3/0484 |
| | | | | 345/594 |
| 9,245,485 | B1 | 1/2016 | Hu | |
| 9,773,474 | B1 | 9/2017 | Gupta et al. | |
| 10,714,052 | B2* | 7/2020 | Maeda | G09G 5/02 |
| 2008/0068403 | A1* | 3/2008 | Kobashi | G06F 3/0485 |
| | | | | 345/684 |
| 2011/0249861 | A1* | 10/2011 | Tokutake | G11B 27/34 |
| | | | | 382/103 |
| 2015/0304615 | A1* | 10/2015 | Hiroi | G06F 3/0488 |
| | | | | 348/744 |
| 2016/0086553 | A1* | 3/2016 | Sato | G09G 3/3607 |
| | | | | 345/88 |
| 2017/0038914 | A1* | 2/2017 | Kawagishi | G16H 30/40 |
| 2018/0025468 | A1* | 1/2018 | Kim | G06T 7/246 |
| | | | | 345/682 |
| 2018/0061025 | A1* | 3/2018 | Ishii | G06T 5/009 |
| 2018/0108326 | A1* | 4/2018 | Maeda | G09G 5/026 |
| 2018/0189955 | A1* | 7/2018 | Moshe | G06K 9/6256 |
| 2018/0336849 | A1* | 11/2018 | Ishii | G06T 5/008 |
| 2019/0287489 | A1* | 9/2019 | Tomizawa | G06T 7/20 |

FOREIGN PATENT DOCUMENTS

| | | |
|---|---|---|
| JP | 2009-139452 A | 6/2009 |
| JP | 2013-218478 A | 10/2013 |

OTHER PUBLICATIONS

Extended European Search Report issued in corresponding European Application No. 18878012.6, dated Feb. 3, 2020.

Notice of Reasons for Refusal issued in corresponding Japanese Application No. 2019-553685, dated Jul. 31, 2020, 6 pages.

* cited by examiner

| MOVING SPEED OF TOUCH POSITION | GRADATION LEVEL |
|---|---|
| LESS THAN V1 | 16 |
| EQUAL TO OR GREATER THAN V1, LESS THAN V2 | 8 |
| EQUAL TO OR GREATER THAN V2 | 2 |

| RATIO OF TEXT AREA | GRADATION LEVEL |
|---|---|
| LESS THAN R1 | 2 |
| EQUAL TO OR GREATER THAN R1, LESS THAN R2 | 8 |
| EQUAL TO OR GREATER THAN R2 | 16 |

FIG. 8

| APPLICATION TYPE | GRADATION LEVEL |
|---|---|
| PHOTO IMAGE BROWSING APPLICATION, IMAGE DRAWING APPLICATION | 2 |
| BROWSER, SNS APPLICATION | 8 |
| DOCUMENT CREATION APPLICATION, DOCUMENT EDITING APPLICATION | 16 |

INFORMATION-PROCESSING DEVICE AND INFORMATION-PROCESSING METHOD

TECHNICAL FIELD

The present invention relates to terminating a user interface technique.

BACKGROUND ART

Japanese Patent Application No. JP 2013-218478 A1 discloses a technique for drawing a scrolled or rotated image in which drawing is performed using a method selected from a method of performing drawing by use of drawing data of a displayed screen or drawing data stored in a reuse data memory and a method of performing normal drawing.

When a displayed image is moved by scrolling, rotating, or being exchanged with another image, or is enlarged or reduced, at least part of the displayed image is moved. The part of the displayed image is rewritten at high speed. A display device, for example, for displaying electronic books may include a display capable of maintaining a displayed image while no power is supplied. Such a display rewrites an image at a slower speed than that of a commonly used liquid crystal display, as a result of which scrolling may not be performed smoothly.

It is an object of the present invention to facilitate moving at least a part of a displayed image at high speed.

To achieve the object, the present invention provides an information-processing device comprising: a detecting unit configured to detect an instruction to move at least part of an image displayed on a display surface; and a display control unit configured to change the image to another image by reducing a number of pixels whose color changes, and to cause the other image to be displayed on the display surface in accordance with an instruction detected by the detecting unit.

The display control unit may be configured to change the image to the other image by reducing a gradation level of the image.

The display control unit may be configured to change the image to the other image by keeping pixels having a minimum value unchanged and changing values of other pixels to a maximum value, or by keeping pixels having a maximum value unchanged and changing values of other pixels to a minimum value.

The display control unit may be configured to change the image to the other image by reducing the gradation level of the image to a gradation level according to a moving speed of the at least part of the image.

The display control unit may be configured to change the image to the other image by reducing the gradation level of the image to a gradation level according to a ratio of a text area included in the image.

The display control unit may be configured to change the image to the other image by reducing the gradation level of the image to a gradation level according to a type of an application that causes the image to be displayed.

The display control unit may be configured to change the image to the other image by binarizing the image based on comparison between values of pixels and a threshold value, the threshold value being a pixel value that has a larger difference from a pixel value of a background image displayed in the background of the object from an average, median, or mode pixel value of the object, the background image being expressed by only pixels having an identical value.

The display control unit may be configured to change the image to the other image that shows a figure of an area in which the image is displayed.

The display control unit may be configured to change the image to the other image that shows a type of the image, and to cause the other image to be displayed in an area in which the image is displayed.

The present invention provides an information-processing method comprising: a detecting step of repeatedly trying by an information-processing device to detect an instruction to move at least part of an image displayed on a display surface; a first change step of, after an instruction is detected as a result of the detecting step, reducing by the information-processing device a gradation level of the image; a first display control step of moving by the information-processing device the at least part of the image in the gradation level reduced at the first change step, in accordance with the instruction detected as a result of the detecting step; a second change step of, after an instruction has ceased to be detected as a result of the detecting step, restoring by the information-processing device the gradation level reduced at the first change step to an original gradation level; and a second display control step of causing by the information-processing device the image to be displayed in the original gradation level restored at the second change step.

The present invention makes it possible to move at least a part of a displayed image at high speed.

DETAILED DESCRIPTION

1 Exemplary Embodiment

Figure 1:
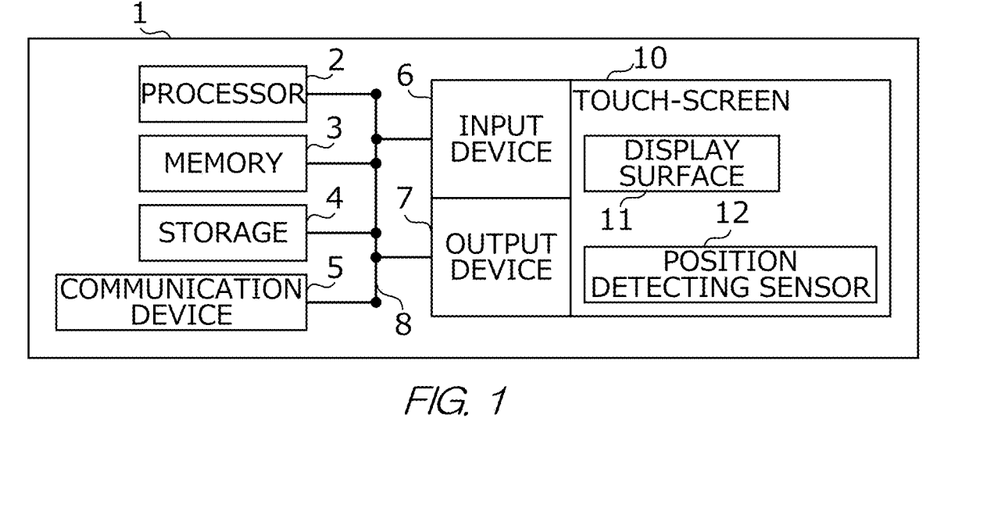
FIG. 1 is a diagram showing a hardware configuration of a smartphone.

FIG. 1 shows a hardware configuration of smartphone 1 according to an exemplary embodiment. Smartphone 1 is a computer including processor 2, memory 3, storage 4, communication device 5, input device 6, output device 7, and bus 8. It is of note that the term "device" may refer to a circuit or unit. Smartphone 1 may include one or more devices shown in the drawing, or some of the devices shown in the drawing may not be included.

Processor 2 controls a computer, for example, by running an operating system. Processor 2 may include a central processing unit (CPU) that includes interfaces to peripheral devices, a control device, an arithmetic device, and a register. Processor 2 reads a program (program code) including an operating system (OS) and applications, a software module, and data from storage 4 and/or communication device 5 to memory 3.

Processor 2 performs various processes based on the read program and data. The various processes may be performed by a single processor 2, or may be performed by two or more processors 2 simultaneously or sequentially. Processor 2 may include one or more chips. The program may be received from a network via electronic communication media.

Memory 3 is a computer-readable recording medium, and, for example, includes at least one of a read only memory (ROM), an erasable programmable ROM (EEPROM), and a random access memory (RAM). Memory 3 may be referred to as a register, a cache, or a main memory. Memory 3 may store a program (program code), a software module, and data.

Storage 4 is a computer-readable recording medium, and, for example, includes at least one of a hard disk drive, a flexible disk, a flash memory (for example, a card, a stick, a key drive), and a magnetic strip. Storage 4 may be referred to as an auxiliary storage device. The recording medium may include, for example, a database, server, or any other suitable medium that includes memory 3 and/or storage 4.

Communication device 5 is hardware (a transmitting and receiving device) for enabling communication between computers via a wired and/or wireless network(s). Communication device 5 may be referred to as a network device, a network controller, a network card, or a communication module. Input device 6 is a device for accepting input from an external source, such as a microphone, a switch, buttons, or a sensor. Output device 7 is a device for performing output to an external device, such as a display, a speaker, or an LED lamp. In smartphone 1, input device 6 and output device 7 constitute touch-screen device 10.

Touch-screen 10 is an output device that displays an image, and is also an input device that receives a user's operation. Touch-screen 10 includes display surface 11 and position detecting sensor 12. In the present exemplary embodiment, touch-screen 10 is an electrophoretic display device, which rewrites a displayed image by use of power, and maintains the rewritten image without consuming power.

Position detecting sensor 12 is a device that detects a position (touch position) touched by a user on display surface 11. In the present exemplary embodiment, position detecting sensor 12 is capable of detecting two touch positions simultaneously to detect a pinch-out (an operation of moving two touch positions apart) and a pinch-in (an operation of moving two touch positions closer). Devices such as processor 2 and memory 3 may access each other via bus 8 for data communication. Bus 8 may include a single bus, or may include plural buses for connecting devices.

It is of note that smartphone 1 may include hardware such as a microprocessor, a digital signal processor (DSP), an application specific integrated circuit (ASIC), a programmable logic device (PLD), and a field programmable gate array (FPGA). The hardware may function as part or all of functional blocks. For example, processor 2 may include at least one of the items of hardware.

Processor 2 of smartphone 1 runs a program to control components to provide functions described below.

Figure 2:
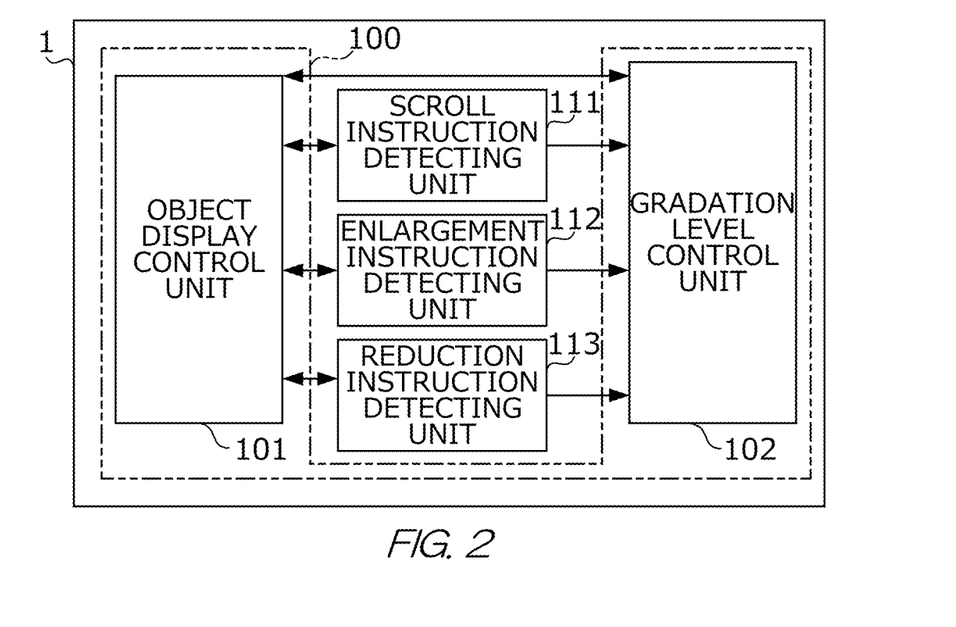
FIG. 2 is a diagram showing a configuration of functions provided by the smartphone.

FIG. 2 shows a configuration of functions provided by smartphone 1. Smartphone 1 includes object display control unit 101, gradation level setting unit 102, scroll instruction detecting unit 111, enlargement instruction detecting unit 112, and reduction instruction detecting unit 113.

Object display control unit 101 causes an object to be displayed on display surface 11. The object may include a character string image, a photo image, a drawn image such as computer graphics or a presentation material image, an image of a web page including these images, a screen of an application such as a map application, or an image associated with a program or data, such as an icon or a shortcut image. The object is an example of an "image" according to the present invention. Object display control unit 101 may display the object in color or in black and white.

Object display control unit 101 retrieves object data stored in memory 3, storage 4, or a storage unit of an external device that can be accessed using communication device 5, to cause an object represented by the retrieved object data to be displayed. The object data includes data for displaying an object as an image. For example, object data of a photo image includes image data represented in a format such as Joint Photographic Experts Group (JPEG).

Object data of a web page includes a Hyper Text Markup Language (HTML) document and image data of images included in the web page. Object display control unit 101 is provided by running a display program for displaying an object, such as an OS or an application. Object display control unit 101 may scroll, enlarge, or reduce a displayed object depending on the display program, a type of a displayed screen, or a state of the displayed object.

Object display control unit 101 provided by running browser program causes a web page that does not fit into one screen to be displayed such that the web page can be scrolled. Object display control unit 101 causes a web page fitting into one screen to be displayed such that the web page cannot be scrolled. Object display control unit 101 provided by running a map application program, upon detecting a pinch-out operation to enlarge a displayed map image, enlarges the displayed map image if the image is not displayed at a maximum scale.

Object display control unit 101 provided by running a map application program, upon detecting a pinch-in operation to reduce a displayed map image, reduces the displayed map image if the image is not displayed at a minimum scale. Object display control unit 101 provided by running a photo browsing application program causes a menu screen to be displayed in a scrollable manner, and causes a photo screen to be displayed such that the photo screen can be enlarged or reduced.

When a displayed object is scrolled, enlarged, or reduced, at least part of the object is moved. Displaying an object at least part of which is moved will hereinafter be referred to "movement display." For example, when a displayed object is scrolled, all parts of the displayed object are moved at an identical speed. When a displayed object is enlarged, parts of the displayed object are moved in a direction away from a point set within the screen (usually, a point set within the boundary of the object) at a speed proportional to a distance from the point. When a displayed object is reduced, parts of the displayed object are moved toward a point set within the screen (usually, a point set within the boundary of the object) at a speed proportional to a distance from the point.

Scroll instruction detection unit 111 detects an instruction to scroll a displayed object. Enlargement instruction detecting unit 112 detects an instruction to enlarge a displayed object. Reduction instruction detecting unit 113 detects an instruction to reduce a displayed object. In short, each of scroll instruction detection unit 111, enlargement instruction detecting unit 112, and reduction instruction detecting unit 113 detects a movement display instruction to move at least part of an object displayed on display surface 11. The movement display instruction will hereinafter be referred to as a "movement instruction." Each of scroll instruction detection unit 111, enlargement instruction detecting unit 112, and reduction instruction detecting unit 113 is an example of a "detecting unit" according to the present invention.

Scroll instruction detecting unit 111 detects an instruction to scroll an object displayed on touch-screen 10 as a movement instruction. Specifically, scroll instruction detection unit 111 acquires, from object display control unit 101, information on a program providing the function, a displayed screen, and a state of a displayed object, to determine whether to allow scroll display based on the acquired information.

When determining that scroll display should be allowed, scroll instruction detecting unit 111 determines, at predetermined time intervals, whether position detecting sensor 12 shown in FIG. 1 has detected a touch position. Upon detecting that two or more touch positions have been continuously detected, which touch positions form a line extending in a direction in which the displayed object can be scrolled, scroll instruction detecting unit 111 detects a scroll instruction.

Upon detecting a scroll instruction, scroll instruction detecting unit 111 notifies gradation level setting unit 102 of the detection of a scroll instruction. Scroll instruction detecting unit 111, when continuously detecting a scroll instruction at the predetermined time intervals, notifies gradation level setting unit 102 of each of the detections of a scroll instruction. When ceasing to detect a scroll instruction, scroll instruction detecting unit 111 stops notifying gradation level setting unit 102 of detection of a scroll instruction.

Gradation level setting unit 102 sets a gradation level of an image displayed on display surface 11. Gradation level setting unit 102 is a function provided by an OS, for example. In smartphone 1, an image of any application is displayed in a gradation level set by gradation level setting unit 102. Gradation level setting unit 102, when notified by scroll instruction detecting unit 111 of detection of a scroll instruction, reduces a gradation level of a displayed image.

For example, gradation level setting unit 102 normally sets a gradation level of an image to a 256-gradation level in which a pixel value indicating a luminance or lightness ranges from 0 to 255, and when notified by scroll instruction detecting unit 111 of detection of a scroll instruction, changes the gradation level to a 2-gradation level. It is of note that the set of gradation levels is merely an example, and any set of gradation levels, one of which used after a scroll instruction is detected is lower than the other, may be used. Gradation level setting unit 102, upon detecting suspension of such a notification from scroll instruction detecting unit 111, restores the gradation level to a 256-gradation level. In the event of each change in the gradation level, gradation level setting unit 102 notifies object display control unit 101 of a changed gradation level.

Scroll instruction detecting unit 111, upon detecting a scroll instruction, provides object display control unit 101 with instruction information indicating a moving direction of a touch position as a scroll direction, and indicating a moving distance of the touch position as a scroll speed that is proportional to the moving distance. Object display control unit 101, when receiving the instruction information, performs scroll display by moving an object at a scroll speed indicated by the instruction information in a scroll direction indicated by the instruction information.

Before performing the scroll display, object display control unit 101 is notified of a changed gradation level from gradation level setting unit 102. Object display control unit 101 converts a gradation level of an object represented by object data to the changed gradation level before performing the scroll display. In the present exemplary embodiment, object display control unit 101 converts the gradation level into a 2-gradation level; in other words, object display control unit 101 binarizes the object by converting values of pixels into 0 (black) or 255 (white).

Specifically, object display control unit 101 determines for pixels of the object that has been displayed before a scroll instruction is detected whether a pixel value ranging from 0 to 255 exceeds a threshold value. Object display control unit 101 generates a binarized image to be displayed as a modified object, in which pixels whose value exceeds the threshold value are represented in black (0-pixel value) and pixels whose value does not exceed the threshold value are represented in white (255-pixel value).

Figure 3A:
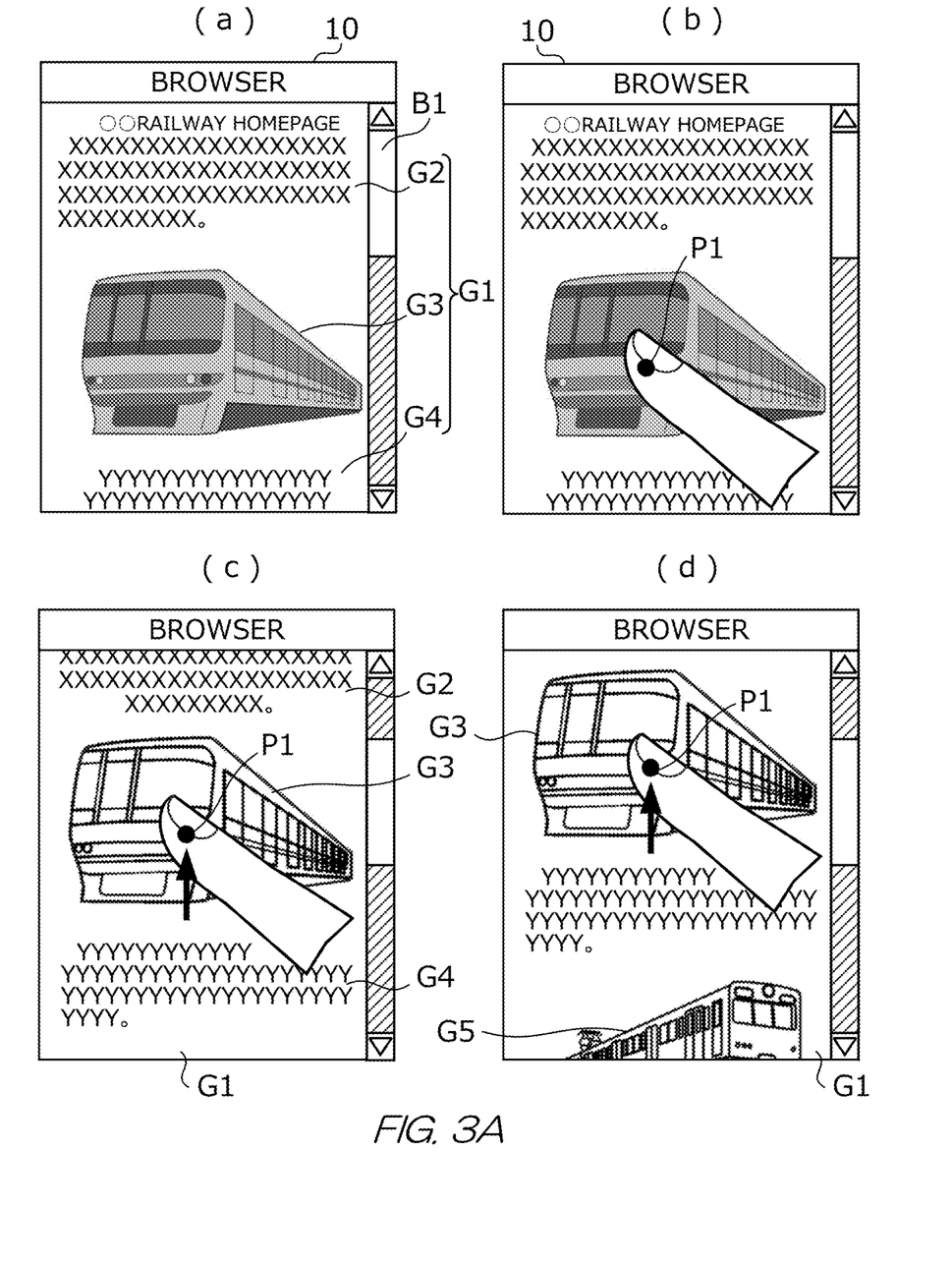
FIG. 3A is a diagram showing an example of scroll display.

FIGS. 3A and 3B show an example of scroll display. FIG. 3A(a) shows web page image G1 that is caused to be displayed on touch-screen 10 by object display control unit 101 that is provided by running a browser program. Web page image G1 includes character string image G2, train photo image G3, and text image G4. Web page image G1 does not fit into one browser screen; accordingly, object display control unit 101 determines that scroll display should be allowed so that scroll bar B1 is displayed.

It is of note that scroll bar B1 may not be displayed. Alternatively, scroll bar B1 may be displayed only during scroll display. FIG. 3A (b) shows that a user touches touch-screen 10 so that touch position P1 is detected. Since only a single touch position is detected, scroll instruction detecting unit 111 does not detect a scroll instruction, and object display control unit 101 maintains the image shown in FIG. 3A(a). FIG. 3A (c) shows that the user moves touch position P1 upward so that scroll instruction detecting unit 111 detects a scroll instruction.

After the scroll instruction is detected, gradation level setting unit 102 sets a gradation level of web page image G1 to a 2-gradation level so that object display control unit 101 converts web page image G1 into a 2-gradation web page image. Character string images G2 and G4 are white-and-black images; accordingly, they remain unchanged after the gradation level is changed from a 256-gradation level to a 2-gradation level. On the other hand, train photo image G3 is a gradation image; accordingly, after the gradation level is changed a 2-gradation level, the image is converted into a white-and-black binarized image, which lacks gradation.

As shown in FIG. 3A(c), object display control unit 101 converts an object such as train photo image G3, which has been displayed before the scroll instruction is detected, to another object by changing values of gray or white pixels to a maximum value, 255, while keeping values of black pixels at a minimum value, 0. According to the conversion, gray parts of the object are made white, while outlines of components shown in the object, such as windows, doors, and lights shown in train photo image G3 are kept in black, so that the shapes of the components are made clear.

It is of note that, in contrast to the above, object display control unit 101 may convert an object to another by changing values of gray or black pixels to a minimum value, 0, while keeping values of white pixels at a maximum value, 255. According to the conversion, gray parts of the object are turned black, so that the outline of the object is made clear.

Figure 3B:
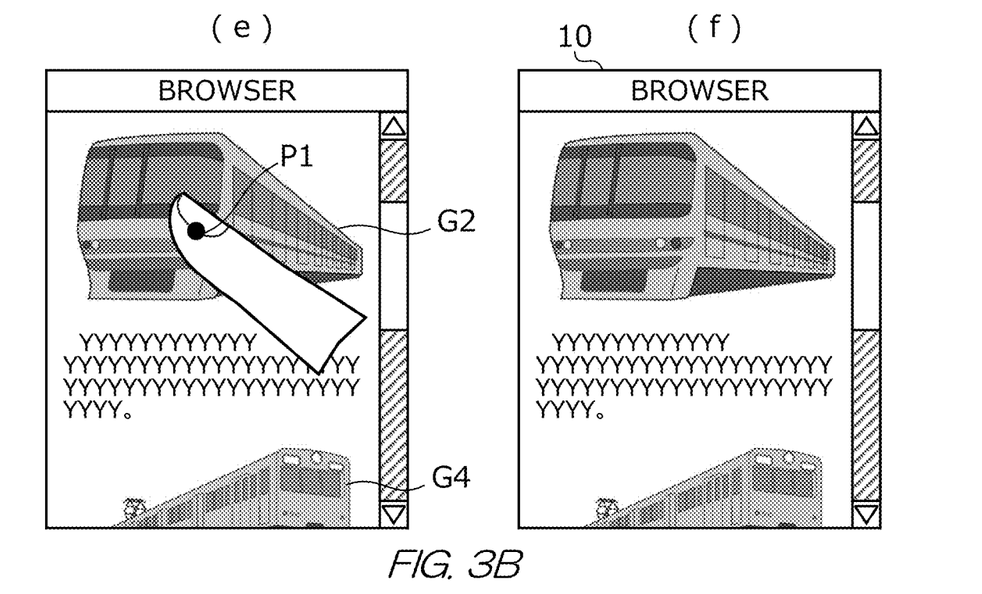
FIG. 3B is a diagram showing an example of scroll display.

FIG. 3A(d) shows that the user moves touch position P1 further upward. As a result of this scrolling, object display control unit 101 causes train photo image G5 to appear in a 2-gradation level that is currently effective. FIG. 3B(e) shows that the user has stopped moving touch position P1. After the user has stopped moving touch position P1, scroll instruction detecting unit 111 detects no scroll instruction.

Gradation level setting unit 102, upon detecting suspension of a notification from scroll instruction detecting unit 111, restores the gradation level of web page image G1 to a 256-gradation level. Object display control unit 101 causes train photo images G3 and G5 to be displayed in the 256-gradation level based on image data included in object data. Object display control unit 101 maintains the screen shown in FIG. 3B(e) after the user has removed his/her finger from touch-screen 10, as shown in FIG. 3B(f).

On touch-screen 10, a gradation is displayed as described below.

Figure 4:
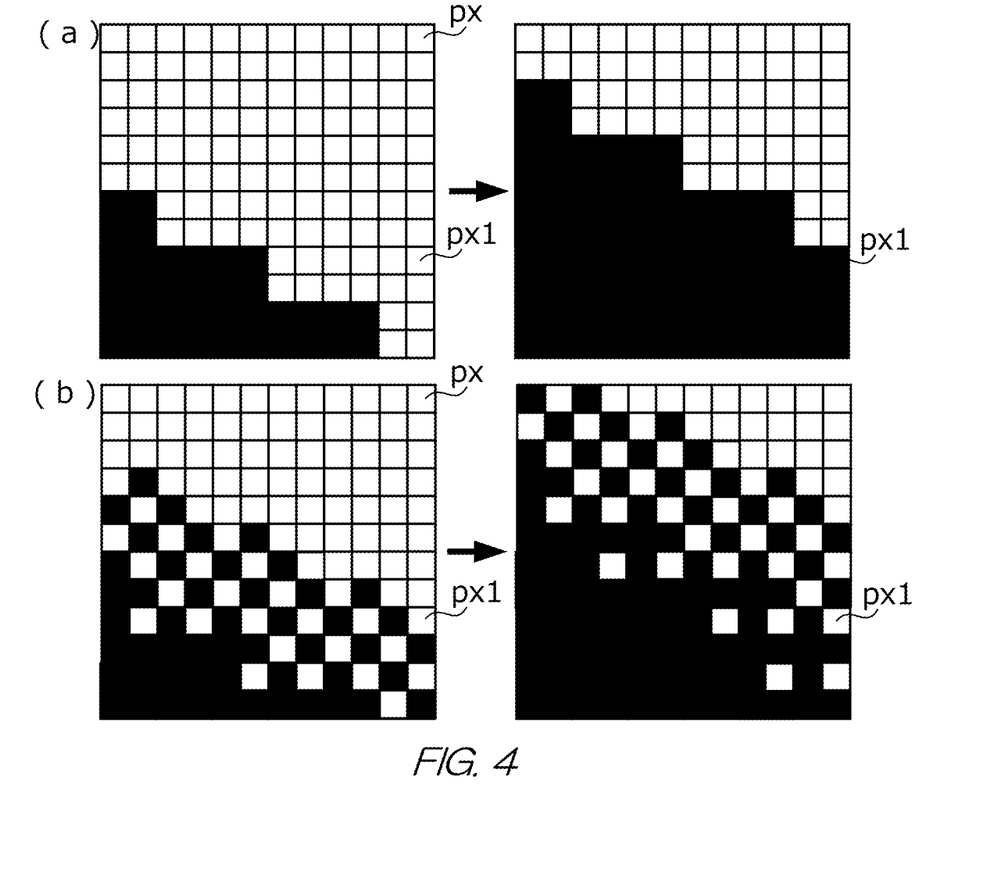
FIG. 4 is an enlarged view of scrolled pixels.

FIG. 4 is an enlarged view of scrolled pixels. FIG. 4(a) shows an object displayed in a 2-gradation level, and FIG. 4(b) shows an object displayed in a gradation level (hereinafter referred to as "multi-gradation level") that is higher than the 2-gradation level. Both FIGS. 4(a) and 4(b) show that object display control unit 101 performs scroll display whereby an object is moved upward.

Object display control unit 101 performs 2-gradation display by making all of 2×2 pixels black or white, as shown in FIG. 4(a). Object display control unit 101 performs multi-gradation display by expressing 2×2 pixels in one of five patterns of all black pixels, a single white pixel, two white pixels, three white pixels, and all white pixels, as shown in FIG. 4(b). For example, focusing on pixel px1 shown in FIG. 4(a), the color of pixel px1 changes from white to black once.

On the other hand, focusing on pixel px1 shown in FIG. 4(b), the color of pixel px1 changes in the following order: white, black, white, black, and white. With further scrolling, the color of pixel px1 changes accordingly. As demonstrated in the foregoing, the number of times the color of a pixel changes increases in proportion to a gradation level. In other words, the number of pixels whose color changes increases in proportion to a gradation level.

In the present exemplary embodiment, object display control unit 101 and gradation level setting unit 102 cooperate to function as display control unit 100 that causes an object to be displayed in a controlled gradation level. Display control unit 100 is an example of a "display control unit" according to the present invention. Specifically, display control unit 100, during movement display (specifically, scroll display) that is performed according to a scroll instruction detected by scroll instruction detecting unit 111, converts an object such that the number of pixels whose color changes decreases relative to an object that has been displayed before the scroll instruction is detected, as described with reference to FIG. 4.

In other words, display control unit 100 converts an object that has been displayed before scroll instruction detecting unit 111 detects a scroll instruction, such that a gradation level of the object is reduced. According to the conversion, the number of pixels whose color changes is reduced, so that a time required to change colors of pixels during scroll display is shortened relative to a case where the gradation level of the object is not changed. In short, scroll display is performed at high speed.

Display control unit 100 also converts a displayed object when the displayed object is enlarged or reduced. Enlargement instruction detecting unit 112 detects an instruction to enlarge an object displayed on touch-screen 10 as an enlargement instruction. For example, enlargement instruction detecting unit 112 detects a pinch-out operation as an enlargement instruction. The pinch-out operation refers to an operation of touching two positions on touch-screen 10 and moving the two touch positions apart.

Enlargement instruction detecting unit 112, after two touch positions are detected, calculates a distance between the two touch positions at a predetermined time interval (for example, every 0.1 seconds), and upon detecting that a calculated distance has increased by a predetermined distance or at a predetermined rate, detects an enlargement instruction. Reduction instruction detecting unit 113 detects an instruction to reduce an object displayed on touch-screen 10 as a reduction instruction.

Reduction instruction detecting unit 113 detects a pinch-in operation as a reduction instruction. The pinch-in operation refers to an operation of touching two positions on touch-screen 10 and moving the two touch positions closer to each other. Reduction instruction detecting unit 113, after two touch positions are detected, calculates a distance between the two touch positions at a predetermined time interval (for example, every 0.1 seconds), and upon detecting that a calculated distance has decreased by a predetermined distance or at a predetermined rate, detects a reduction instruction.

Display control unit 100, during movement display (specifically, enlargement) that is performed according to an enlargement instruction detected by enlargement instruction detecting unit 112, or during movement display (specifically, reduction) that is performed according to a reduction instruction detected by reduction instruction detecting unit 113, converts an object that has been displayed before an enlargement or reduction instruction is detected, such that a gradation level of the object is reduced. In other words, display control unit 100 converts an object such that the number of pixels whose color changes decreases relative to an object that has been displayed before an enlargement or reduction instruction is detected.

Smartphone 1 having the configuration described in the foregoing performs a displayed image moving process for moving a displayed object.

Figure 5:
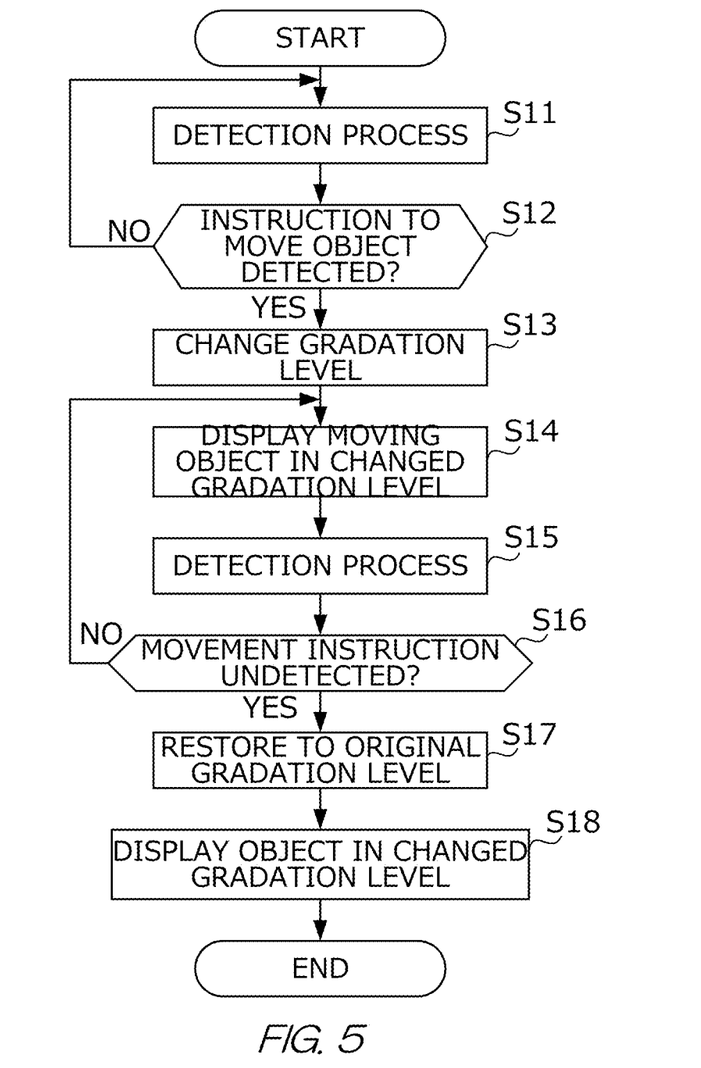
FIG. 5 is a diagram showing an example of an operation procedure of a displayed image moving process.

FIG. 5 shows an example of an operation procedure of the displayed image moving process. The operation procedure is started after object display control unit 101 of smartphone 1 causes an object to be displayed on display surface 11.

Initially, smartphone 1 (scroll instruction detecting unit 111, enlargement instruction detecting unit 112, and reduction instruction detecting unit 113) performs a detection process for detecting a movement instruction directed to the object (step S11). Smartphone 1 (gradation level setting unit 102) determines whether a movement instruction has been detected in the detection process of step S11 (step S12), and upon determining that no movement instruction has been detected (NO), returns to step S11. Smartphone 1 repeatedly tries to detect a movement instruction directed to the object. Steps S11 and S12 are examples of a "detection step" according to the present invention.

Smartphone 1 (gradation level setting unit 102), upon determining at step S12 that a movement instruction has been detected (YES), reduces a gradation level of the object (step S13). Step S13 is an example of a "first change step" according to the present invention. Smartphone 1 (object display control unit 101) moves (specifically, scrolls, enlarges, or reduces) the object displayed in the gradation level changed at step S13, in accordance with the movement instruction detected at step S11 (step S14). Step S14 is an example of a "first display control step" according to the present invention.

Subsequently, smartphone 1 (scroll instruction detecting unit 111, enlargement instruction detecting unit 112, and reduction instruction detecting unit 113) performs the detection process again (step S15). The detection process of steps S11 and S15 is repeatedly performed at the predetermined time interval described above. Smartphone 1 (object display control unit 101 and gradation level setting unit 102) determines at step S15 whether a movement instruction has ceased to be detected (step S16), and upon determining that a movement instruction has not ceased to be detected (NO), performs steps S14 and S15. Steps S15 and S16 are examples of the "detection step" according to the present invention.

Smartphone 1 (gradation level setting unit 102), upon determining that a movement instruction has ceased to be detected (YES), restores the gradation level reduced at step S13 to an original gradation level (step S17). Step S17 is an example of a "second change step" according to the present invention. Smartphone 1 (object display control unit 101) causes the object to be displayed in the gradation level changed at step S17 (step S18). Step S18 is an example of a "second display control step" according to the present invention. Subsequently, smartphone 1 concludes the operation procedure and restarts the operation procedure.

In the present exemplary embodiment, an object to be scrolled, enlarged, or reduced is displayed in a reduced gradation level. Accordingly, the number of pixels whose color changes is reduced, whereby a time required to change colors of pixels is shortened, as described with reference to FIG. 4. In short, an operation of moving at least a part of the displayed image is performed at a higher speed relative to a case where a gradation level is not changed. Also, since the number of pixels whose color changes is reduced, power required to change colors of pixels is reduced. In short, the operation of moving at least a part of the displayed image consumes less power than in a case where a gradation level is not changed.

2 Modifications

The above exemplary embodiment is merely an example of an embodiment of the present invention, and may be modified as described below.

2-1 Method of Deciding a Gradation Level

In the above exemplary embodiment, display control unit 100, after an instruction to scroll, enlarge, or reduce a displayed object is detected, causes the object to be displayed in a predetermined reduced gradation level. However, display control unit 100 may cause the object to be displayed in a gradation level according to a moving speed of the object that is being scrolled, enlarged, or reduced.

Although not described in detail in the above exemplary embodiment, scroll instruction detecting unit 111, enlargement instruction detecting unit 112, and reduction instruction detecting unit 113, after detecting an instruction such as a scroll instruction, detect a moving speed of touch positions to notify to object display control unit 101. Object display control unit 101 moves a displayed object at a speed according to the detected moving speed. For example, the speed at which the displayed object is moved is proportional to a speed at which touch positions are moved.

A moving speed of a scrolled object refers to a moving speed of an entire object, since all portions of the entire object move at an identical speed. This moving speed may be represented by the number of pixels equivalent to a distance by which the object moves per unit time (for example, 100 pixels per 0.1 seconds). On the other hand, a moving speed of an enlarged or reduced object varies by portion of the object. A moving speed of the center of the enlarged or reduced object is zero, while a moving speed of another portion increases in proportion to a distance from the center.

Display control unit 100 moves a displayed object that is scrolled, enlarged, or reduced, at a speed according to a moving speed of touch positions. When doing so, display control unit 100 causes the object to be displayed in a gradation level according to the moving speed of touch positions. In other words, display control unit 100 causes the object to be displayed in a gradation level according to a moving speed of the object.

Display control unit 100 (gradation level setting unit 102) stores and uses a gradation level table in which a moving speed of touch positions that is equivalent to a moving speed of an object is associated with a gradation level.

Figure 6:
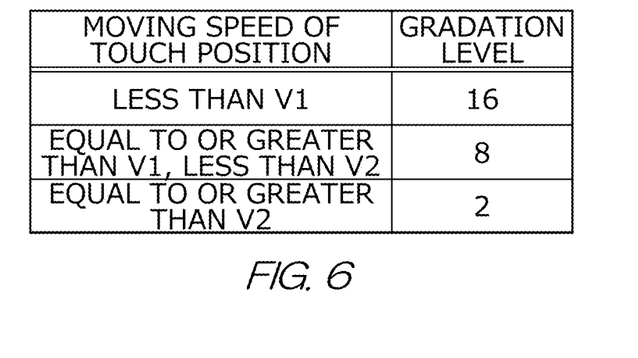
FIG. 6 is a diagram showing an example of a gradation level table according to a modification.

FIG. 6 shows an example of the gradation level table according to the present modification. In the gradation level table, moving speeds of touch positions "less than V1," "equal to or greater than V1, less than V2," and "equal to or greater than V2" are associated with gradation levels "16," "8," and "2," respectively.

In the present modification, a normal gradation level is set to 256, as in the case of the above exemplary embodiment. Scroll instruction detecting unit 111, enlargement instruction detecting unit 112, and reduction instruction detecting unit 113 notify gradation level setting unit 102 of a detected moving speed of touch positions. Gradation level setting unit 102 changes a gradation level of an image displayed on display surface 11 to a gradation level associated with the notified moving speed in the gradation level table.

Display control unit 100 (object display control unit 101 and gradation level setting unit 102) causes an object to be displayed in a gradation level according to a moving speed of the object (in other words, a moving speed of touch positions), as described above. As a gradation level of a photo image is reduced, the resultant photo image becomes more different from the original photo image, whereby it becomes harder to recognize what the resultant photo image shows. However, since, as a moving speed of a displayed object increases, it becomes harder to recognize what the moving object shows, making a significant reduction in a gradation level of an object that is moved at high speed does not cause much inconvenience to a user.

On the other hand, in a situation where a user moves an object slowly while checking it, it is desirable not to make a significant reduction in a gradation level of the object, so that the user is able to recognize what the object shows. In the present modification, a gradation level of a displayed object is reduced in proportion to a moving speed of the object, as described above; accordingly, an operation of moving at least a part of the object is performed at higher speed, while a user is enabled to recognize what the moving object shows if s/he intends to do so.

2-2 Text Area

In a case where an object is a text image that is expressed in a 2-gradation level such as in black and white, the number of pixels whose color changes is smaller than that of another type of object. Accordingly, as an area of text included in an object increases (in other words, as an area of a photo image decreases), the object can be moved at a higher speed.

In view of this, in the present modification, display control unit 100 (object display control unit 101 and gradation level setting unit 102) converts a displayed object that has been displayed before a movement instruction is detected, such that a gradation level of the object accords to a ratio of a text area included in the object. To achieve this, for example, object display control unit 101 calculates an area of the object and the text area included in the object.

Figure 7:
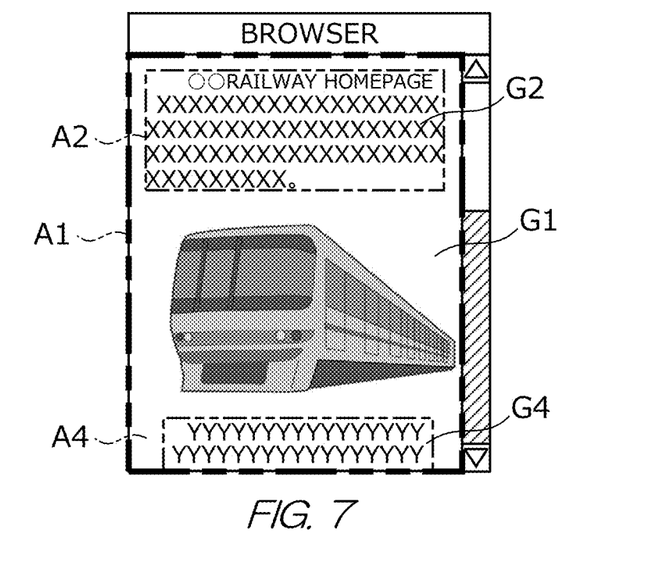
FIG. 7 is a diagram showing an example of an area to be calculated.

FIG. 7 shows an example of areas to be calculated. The drawing shows web page image G1 shown in FIG. 3. Object display control unit 101 calculates area C1 of web page image G1 by multiplying the number of pixels of the long side of rectangular display area A1 by the number of pixels of the short side of rectangular display area A1. Also, object display control unit 101 calculates area C2 of rectangular circumscribing figure A2 that circumscribes character string image G2, and area C4 of rectangular circumscribing figure A4 that circumscribes text image G4.

Object display control unit 101 may identify circumscribing figures A2 and A4 based on the number of characters, a character size, or arrangement of text described in an HTML document, or by using a commonly used text recognition technique to recognize text and its position. Object display control unit 101 provides calculated areas C1, C2, and C4 to gradation level setting unit 102.

Gradation level setting unit 102 stores and uses a gradation level table in which a ratio of text area is associated with a gradation level.

Figure 8:
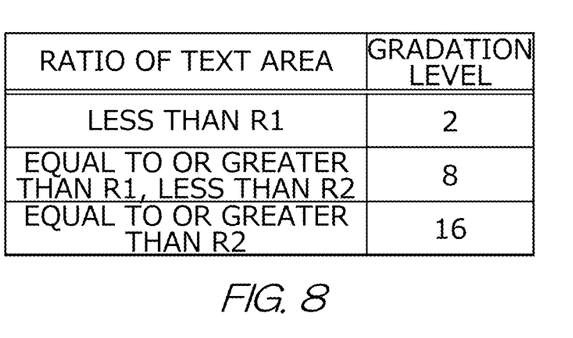
FIG. 8 is a diagram showing an example of a gradation level table according to a modification.

FIG. 8 shows an example of the gradation level table according to the present modification. In the gradation level table, ratios of text area "less than R1," "equal to or greater than R1, less than R2," and "equal to or greater than R2" are associated with gradation levels "2," "8," and "16," respectively.

In the present modification, a normal gradation level is set to 256, as in the above exemplary embodiment. Gradation level setting unit 102 calculates ratio R of a text area by substituting areas C1, C2, and C4 provided by object display control unit 101 into an equation, (area C2+area C4)/area C1=ratio R. Gradation level setting unit 102 changes a gradation level of an image displayed on display surface 11 to a gradation level associated with the calculated ratio in the gradation level table.

In the present modification, display control unit 100 (object display control unit 101 and gradation level setting unit 102) causes an object to be displayed in a gradation level according to a ratio of a text area, as described above. As a text area included in an object increases, the object can be moved at a higher speed, as described above. Accordingly, an object including a large text area, whose gradation level has only been reduced to 16, not 2, can be moved at high speed, unlike an object including a small text area.

A small reduction in a gradation level makes it easy to recognize what an object (especially, an object included in a non-text area) that is being moved shows. According to the present modification, an operation of moving an object is performed at higher speed relative to a case where a gradation level is not changed. In addition, an object that is being moved can be made easier to recognize relative to a case where a gradation level is always reduced to an identical value.

2-3 Type of Application

In general, a ratio of a text area depends on a type of an application. For example, a screen of a document creation application or a document editing application is likely to have a high ratio of a text area, while a screen of a photo image browsing application or an image drawing application is likely to have a low ratio of a text area.

In view of this, in the present modification, it is assumed that a ratio of a text area can be determined based on a type of an application that causes an object to be displayed; accordingly, display control unit 100 (object display control unit 101 and gradation level setting unit 102) uses a gradation level associated with a type of an application. Gradation level setting unit 102 stores and uses a gradation level table in which a type of an application is associated with a gradation level.

Figure 9:
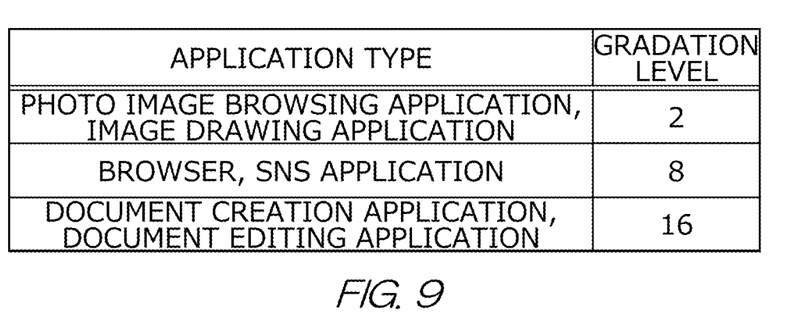
FIG. 9 is a diagram showing an example of a gradation level table according to a modification.

FIG. 9 shows an example of the gradation level table according to the present modification. In the gradation level table, types of an application "photo image browsing application and image drawing application," "browser and social networking service (SNS) application," and "document creation application and document editing application" are associated with gradation levels "2," "8," and "16," respectively.

Gradation level setting unit 102 identifies a type of an application that provides object display control unit 101, and converts a gradation level of an image displayed on display surface 11 into a gradation level that is associated with the identified type of an application in the gradation level table. For example, gradation level setting unit 102, on identifying an image drawing application, converts the gradation level into a 2-gradation level, and on identifying a document creation application, converts the gradation level into a 16-gradation level. In the present modification, a table in which a type of an application is associated with a ratio of a text area does not have to be used; instead, the table shown in FIG. 9 in which a type of an application is directly associated with a gradation level may be used.

As described with reference to FIG. 9, in the present modification, display control unit 100 (object display control unit 101 and gradation level setting unit 102) causes an object to be displayed in a gradation level that is associated with an application that causes the object to be displayed. Display control unit 100 can achieve the effect described with reference to FIG. 8, without having to perform an operation to calculate a ratio of a text area, described with reference to FIG. 7.

2-4 Moving Displayed Object

In the above exemplary embodiment, as an example of an operation of moving at least part of a displayed object, scrolling, enlarging, and reducing are used; however, these operations are merely examples. The operation of moving a displayed object may include rotating a displayed object and moving a displayed object such as an icon.

When a displayed object is enlarged, reduced, or rotated, the entire object may not be moved; however, at least part of the object is moved. The operation of moving a displayed object may also include deforming and moving a displayed object, such as displaying a page that is being turned. When a displayed object is modified and moved, at least part of the object is moved. In either case, the number of pixels whose color changes is reduced, as in the case of the above exemplary embodiment, whereby an operation of moving an object is performed at a higher speed relative to a case where a gradation level is not changed.

2-5 Background Image

In the background of an object, an image expressed by pixels having an identical value, such as a white or black image, may be displayed.

Figure 10:
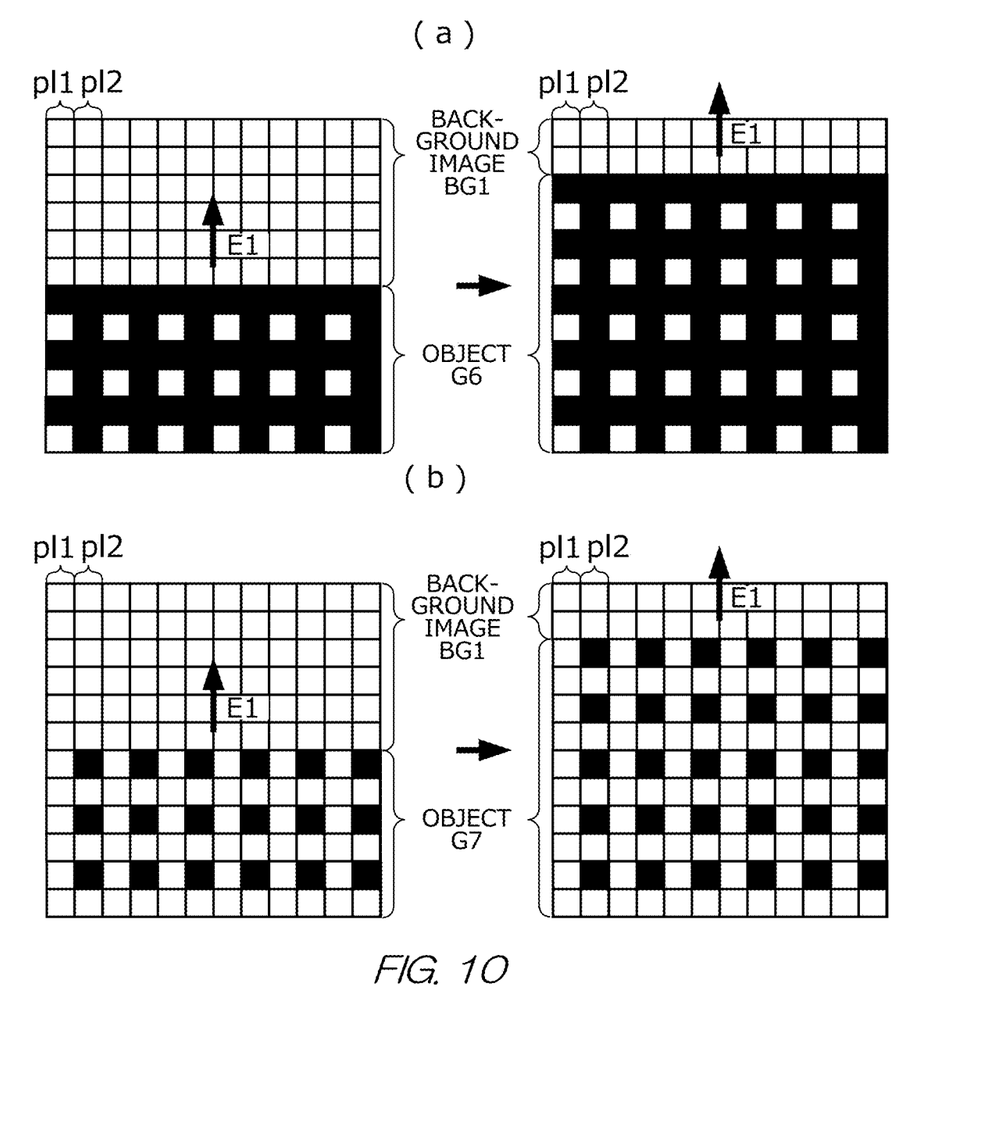
FIG. 10 is a diagram showing examples of a background image.

FIG. 10 shows white background image BG1 as an example of the background image. FIG. 10(*a*) shows that dark object G6 moves in the direction of arrow E1 so as to overlap background image BG1.

FIG. 10(b) shows that whitish object G7 moves in the direction of arrow E1 so as to overlap background image BG1. Both objects G6 and G7 are generated by display control unit 100 (object display control unit 101 and gradation level setting unit 102) by binarizing an object that has been displayed before a movement instruction is detected, based on comparison between pixel values and a threshold value, as in the case of the above exemplary embodiment.

In background image BG1 shown in FIG. 10(a), among pixels overlapping object G6, pixels of odd-numbered pixel rows pl1 change in color in the following order: white, black, and white, and pixels of even-numbered pixel rows pl2 change in color from white to black. In background image BG1 shown in FIG. 10(b), among pixels overlapping object G7, pixels of odd-numbered pixel rows pl1 do not change in color, and pixels of even-numbered pixel rows pl2 change in color in the following order: white, black, and white.

In short, as a color of pixels of an object is closer to a color of pixels of a background image (in the present example, as a color is closer to white), a smaller number of pixels of the object, when it is moved, change in color. In view of this, in the present modification, display control unit 100 changes a threshold value for binarizing an object, based on a background image such that a color of a converted object comes closer to that of the background image.

Specifically, display control unit 100, when converting an object that has been displayed over a background image expressed by pixels having an identical value before a movement instruction is detected, uses as a threshold value a pixel value that has a larger difference from a pixel value of the background image than an average, median, or mode pixel value of the object. The median pixel value refers to a pixel value positioned in the center of all pixel values of the object, arranged in ascending order, and the mode pixel value refers to a pixel value that appears most frequently among those pixel values.

For example, display control unit 100 which causes an object to be displayed in a 256-gradation level, in a case where a median value of pixel values (for example, luminance) is 150 and a pixel value of a background image is 255 (white), uses as a threshold value a pixel value of 149 or less, that has a larger difference from the pixel value, 255, than the median value, 150. By setting the threshold value in this manner, the object is converted into a whitish image that is expressed by more pixels whose value is 255 (white) than pixels whose value is 0 (black).

As described in the foregoing, in the present modification, a threshold value for binarizing an object is changed based on a background image, so that the number of pixels whose color changes during movement display is reduced. Accordingly, an operation of moving the object is performed at a higher speed relative to a case where the threshold value is fixed. It is of note that pixel values of a background image do not have to be identical, and some areas of the background image may have a different color. For example, the white background image shown in FIG. 10 may include some black areas. In such a case, the number of pixels whose color changes during movement display is smaller in the case shown in FIG. 10(b) than in the case shown in FIG. 10(a), whereby the movement display is performed at a higher speed in the case shown in FIG. 10(b).

2-6 Area Image

A method for reducing the number of pixels whose color changes is not limited to reducing a gradation level.

When a user is scrolling a web page including objects such as a character string image, a photo image, and a drawing image, s/he may be able to determine which object to browse, based on shapes of object areas, without having to know details of the objects such as character strings or a subject of a photo.

In view of this, in the present modification, display control unit 100 (object display control unit 101 and gradation level setting unit 102) converts a displayed object that has been displayed before a movement instruction is detected, into an area figure that shows an area in which the object is included.

Figure 11:
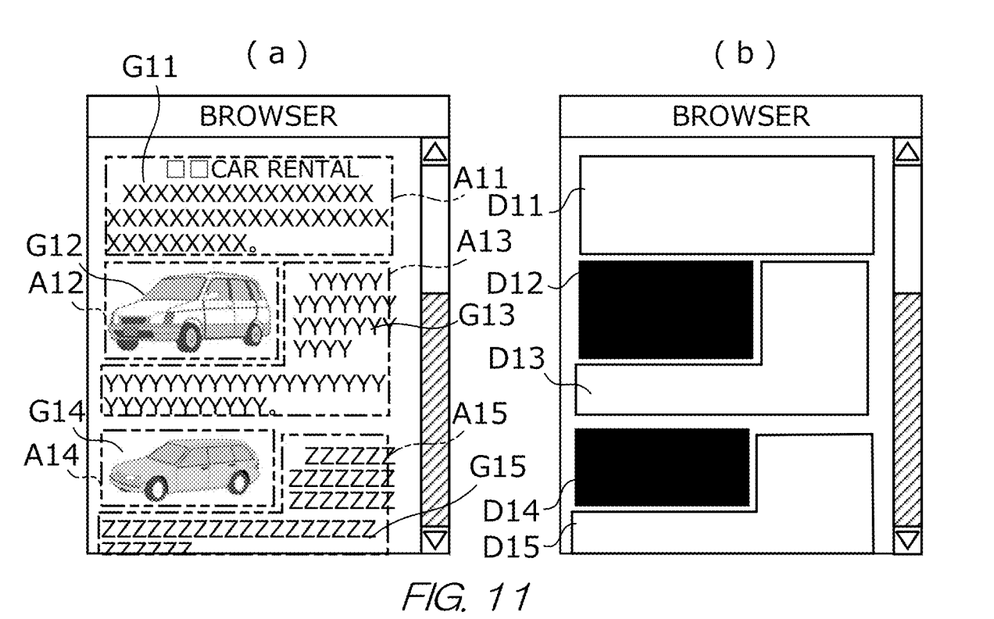
FIG. 11 is a diagram showing examples of an area figure.

FIG. 11 shows examples of the area figure. FIG. 11(a) shows a web page caused to be displayed by display control unit 100, which includes as objects, character string images G11, G13 and G15, and car photo images G12 and G14.

Display control unit 100 identifies circumscribing figures A11, A13, and A15 of character string images G11, G13, and G15 by use of, for example, the method described with reference to FIG. 7. Display control unit 100 also identifies circumscribing figures A12 and A14 of car photo images G12 and G14 based on, for example, sizes and arrangement of the car photo images described in an HTML document. Circumscribing figures A12 and A14 are figures that circumscribe a rectangular outer edge of an image file, not an outline of a car.

Display control unit 100, after a movement instruction is detected, identifies the circumscribing figures of the displayed objects, as shown in FIG. 11(a), and causes area figures D11, D12, D13, and D14, which correspond to the identified circumscribing figures, to be displayed, as shown in FIG. 11(b). FIG. 11 shows that display control unit 100 converts each of the objects into an area figure that includes an area that is surrounded by an outer edge of a circumscribing figure and is expressed by pixels of an identical color, which area figure is an image simpler in shape and color than the original object.

According to the conversion, the number of pixels whose color changes when the objects are moved is reduced, so that an operation of moving the objects is performed at a higher speed relative to a case where the conversion is not performed. During the movement display, shapes of the objects can be recognized from the circumscribing figures, and arrangement of the objects can be recognized from a positional relationship of the circumscribing figures.

It is of note that an area figure is not limited to the type of a circumscribing figure described above. For example, an area figure may include a circumscribing figure whose sides are represented by a dash or chain line, or may be represented by only corners of a circumscribing figure. Alternatively, an area figure may include a one-colored circumscribing figure having no outline. These types of area figures can show an area in which an object is included, so that a user is able to recognize shapes and arrangement of displayed objects that are being moved.

Display control unit 100 causes an area figure, which is represented by pixels of a color according to a type of a corresponding object, to be displayed. In the web page image shown in FIG. 11, display control unit 100 causes area figures D11, D13, and D15 of character string images to be displayed in white, and causes area figures D12 and D14 of photo images to be displayed in black, so that a user is able to recognize the types of the objects while they are being moved. This effect of the present modification is available not only in scroll display but also in other types of movement display.

2-7 Type Image

A method for reducing the number of pixels whose color changes is not limited to reducing a gradation level.

When a user is scrolling a web page including objects such as a character string image, a photo image, and a drawing image, s/he may be able to determine which object to browse, based on types of the objects, without having to know details of the objects such as character strings or a subject of a photo.

In view of this, in the present modification, display control unit 100 (object display control unit 101 and gradation level setting unit 102) converts a displayed object that has been displayed before a movement instruction is detected into a type image that shows a type of the object and an area in which the object is included.

Figure 12:
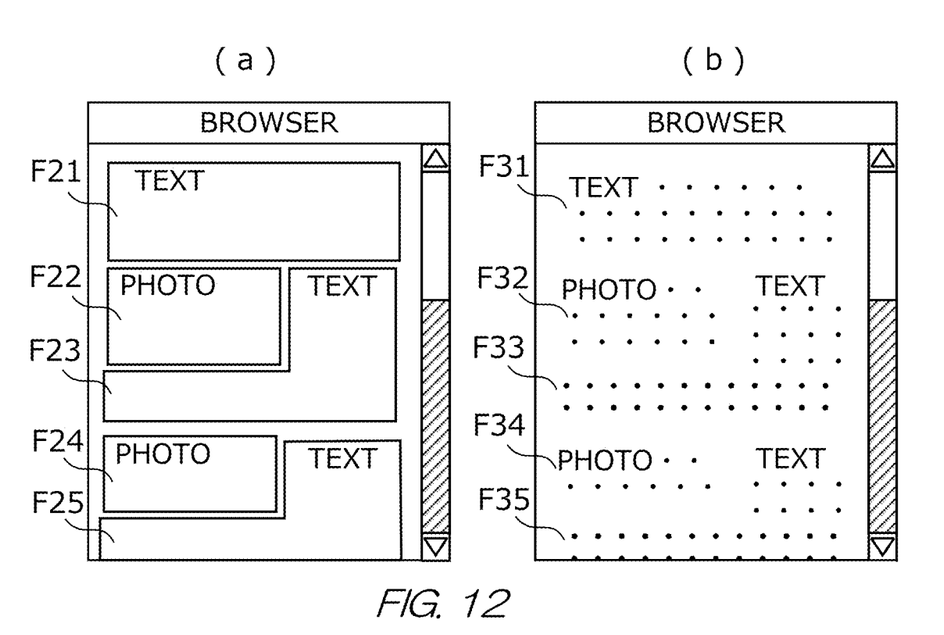
FIG. 12 is a diagram showing examples of a type figure.

FIG. 12 shows examples of the type figure. FIG. 12(a) shows type images F21, F23, and F25 into which character string images G11, G13, and G15 shown in FIG. 11(a) are converted by display control unit 100, and type images F22 and F24 into which car photo images G12 and G14 shown in FIG. 11(a) are converted by display control unit 100.

Type images F21, F23, and F25 include the outer edges of area figures D11, D13, and D15 of character string images G11, G13, and G15 shown in FIG. 11(b), and character strings "text" indicative of a character string image. Type images F22 and F24 include the outer edges of area figures D12 and D14 of car photo images G12 and G14 shown in FIG. 11(b), and character strings "photo" indicative of a photo image.

FIG. 12(b) shows type images F31, F33, and F35 into which character string images G11, G13, and G15 are converted by display control unit 100, and type images F32 and F34 into which car photo images G12 and G14 are converted by display control unit 100. Each of type images F31, F33, and F35 includes a character string "text" indicative of a character string image, and symbols " . . . " that fill a display area of an object.

Each of type images F32 and F34 includes a character string "photo" indicative of a photo image, and symbols " . . . " that fill a display area of an object. It is of note that display control unit 100 may cause a different type image to be displayed depending on a type of an object. For example, a type image of a character string may include symbols " . . . ," while a type image of a photo image may include symbols "* * *," so that a user is able to recognize a type of an object easily relative to a case where identical symbols are used.

The present modification is effective not only in scroll display but also in other types of movement display. A type image is not limited to the images described in the foregoing, and may be different in color density depending on a type of an object. For example, a type image of a character string may be a one-colored image of a first density, while a type image of a photo image may be a one-colored image of a second density. On condition that a user knows which density corresponds to which type of an object, the present modification is effective.

2-8 Gradation Level Setting Unit

In the above exemplary embodiment, gradation level setting unit 102 sets gradation levels of all images displayed on display surface 11 to an identical value; however, gradation level setting unit 102 may separately set a gradation level of a displayed object to be moved according to a movement instruction, and a gradation level of other displayed images. For example, gradation level setting unit 102 may set a gradation level of a displayed object to be moved to a 2-gradation level, and set a gradation level of other displayed images to a 256-gradation level. In this case, the number of pixels of the object whose color changes is reduced, whereby an operation of moving the object is performed at higher speed.

2-9 Functional Configuration

A functional configuration of smartphone 1 is not limited to that shown in FIG. 2. For example, plural functional blocks shown in FIG. 2 may be integrated into one functional block. A function block including plural functions may be divided into plural functional blocks. From a functional block performing plural operations, one of the operations may be transferred to another functional block.

For example, scroll instruction detecting unit 111, enlargement instruction detecting unit 112, and reduction instruction detecting unit 113 may be integrated into a movement instruction detecting unit that detects a movement instruction. Smartphone 1 may include the function of object display control unit 101 for converting an object, as an object change unit. Any functional configuration that functions in the same way as the functional configuration shown in FIG. 2 may be adapted.

2-10 Movement Instruction

A movement instruction is not limited to the types of movement instruction described in the foregoing. For example, a scroll instruction may be performed by moving two or more touch positions, instead of a single touch position, or by operating a scroll bar. An enlargement instruction may be performed by operating an enlargement button, and a reduction instruction may be performed by operating a reduction button. Any other button operation or gesture may be performed as a movement instruction.

2-11 Display Device

In the above exemplary embodiment, an electrophoretic display device may be replaced with a liquid crystal display or an organic electro-luminescence (EL) display. Any other display device that requires a longer time to perform movement display in proportion to the number of pixels whose color changes, may be used.

2-12 Categories of Invention

The present invention may be applied to an information-processing device other than a smartphone, such as a tablet terminal, a feature phone, a notebook computer, or a desktop computer including a display. In essence, the present invention may be applied to any information-processing device that controls a display device, and provides the functions shown in FIG. 2.

The present invention may be implemented in an information-processing method performed by an information-processing device, or in a program for causing a computer to function as an information-processing device. The program may be distributed in the form of a recording medium such as an optical disc, or may be downloaded and installed to a computer via a network such as the Internet.

2-13 Process

The order of processes, sequences, and flowcharts of exemplary embodiments described in the present specification may be changed as long as no inconsistency is caused. Methods described in the present specification include steps arranged in an exemplary order, and the steps may be arranged in another order.

2-14 Input or output information

Input or output information may be stored in a location such as memory, or may be managed in a management table. Input or output information may be overwritten, updated, or additionally written. Output information may be deleted. Input information may be sent to another device.

2-15 Software

Software should be interpreted broadly to include instructions, instruction sets, codes, code segments, program codes, a program, a subprogram, software modules, an application, a software application, a software package, a routine, a subroutine, an object, an executable file, an execution thread, a procedure, and a function, regardless of whether it is called software, firmware, middleware, microcode, hardware description language, or any other name.

Software and instructions may be sent and received via a transmission medium. For example, software may be sent from a website, a server, or another remote source, using a wired medium such as a coaxial cable, a fiber optic cable, a twisted pair, or a digital subscriber line (DSL), and/or a wireless medium such as infrared, wireless, or microwave. The wired medium and the wireless medium are included within the definition of a transmission medium.

2-16 Information and Signal

Information and signals described in the present specification may be represented using any of various technologies. For example, data, instructions, commands, information, signals, bits, symbols, and chips that are described in the foregoing, may be represented by voltages, currents, electromagnetic waves, magnetic fields or particles, optical fields or photons, or any combination thereof.

2-17 Meaning of "Based On"

The description "based on" used in the present specification does not mean "based only on," unless explicitly stated otherwise. In other words, the description "based on" means both "based only on" and "based at least on."

2-18 "And" and "or"

In the present specification, a description "A and B" may be replaced with "A or B," and a description "A or B" may be replaced with "A and B," on condition that the replacement causes no problem for implementation of the present invention, and causes no inconsistency with other descriptions.

2-19 Variations of Embodiments

Exemplary embodiments described in the present specification may be used separately or in combination with minor changes. A notification of information (for example, a notification of "being X") may be made explicitly or implicitly.

The present invention is described in detail in the foregoing; however, it is apparent to those skilled in the art that the present invention is not limited to the embodiments described in the present specification. The present invention may be implemented in modified or changed embodiments, without departing from the spirit and scope of the present invention defined by the description of the claims. The description in the present specification is for illustrative purposes and is not intended to limit the present invention in any way.

DESCRIPTION OF REFERENCE NUMERALS 1 smartphone
100 display control unit
101 object display control unit
102 gradation level setting unit
111 scroll instruction detecting unit
112 enlargement instruction detecting unit
113 reduction instruction detecting unit

The invention claimed is:

1. An information-processing device comprising:
a processor configured to:
detect an instruction to move at least part of an image displayed on a display surface, the at least part of the image having an original graduation level;
identify a moving speed of the at least part of the image;
identify a reduced graduation level from a table based on the moving speed of the at least part of the image;
change the at least part of the image by reducing the original gradiation level of the at least part of the image to the reduced graduation level;
cause the at least part of the image having the reduced graduation level to be displayed on the display surface in accordance with the instruction detected;
detect that the instruction to move the at least part of the image displayed on a display surface has ceased; and
change the at least part of the image having the reduced graduation level to the original graduation level when detecting the instruction to move the at least part of the image has ceased.

2. The information-processing device according to claim 1, wherein processor is further configured to:
change the at least part of the image to the at least part of the image having the reduced graduation level by keeping pixels having a minimum value unchanged and changing values of other pixels to a maximum value, or by keeping pixels having a maximum value unchanged and changing values of other pixels to a minimum value.

3. The information-processing device according to claim 1, wherein the processor is further configured to:
change the at least part of the image to the at least part of the image having the reduced graduation level by reducing the gradation level of the at least part of the image to a gradation level according to a ratio of a text area included in the at least part of the image.

4. The information-processing device according to claim 1, wherein the processor is further configured to:
change the at least part of the image to the at least part of the image having the reduced graduation level by reducing the gradation level of the at least part of the image to a gradation level according to a type of an application that causes the at least part of the image to be displayed.

5. The information-processing device according to claim 1, wherein processor is further configured to:
change the at least part of the image to the at least part of the image having the reduced graduation level by binarizing the image based on comparison between values of pixels and a threshold value, the threshold value being a pixel value that has a larger difference from a pixel value of a background image displayed in the background of the at least part of the image from an average, median, or mode pixel value of the at least part of the image, the background image being expressed by only pixels having an identical value.

6. The information-processing device according to claim 1, wherein the processor is further configured to:
change the at least part of the image to the at least part of the image having the reduced graduation level that shows a figure of an area in which the at least part of the image is displayed.

7. The information-processing device according to claim 1, wherein the processor is further configured to:

change the at least part of the image to the at least part of the image having the reduced graduation level that shows a type of the at least part of the image, and to cause the at least part of the image having the reduced graduation level to be displayed in an area in which the at least part of the image is displayed.

8. The information-processing device according to claim 1, wherein the moving speed of the at least part of the image is equivalent to the same moving speed of movement of touch positions of the instruction on the display screen.

9. The information-processing device according to claim 1, wherein the instruction to move at least part of the image displayed on the display surface includes at least one of scrolling, enlarging, and reducing the at least part of the image.

10. An information-processing method comprising:
   detecting an instruction to move at least part of an image displayed on a display surface, the at least part of the image having an original graduation level;
   identifying a moving speed of the at least part of the image;
   identifying a reduced graduation level from a table based on the moving speed of the at least part of the image;
   changing the at least part of the image by reducing the original gradation level of the at least part of the image to the reduced graduation level;
   causing the at least part of the image having the reduced graduation level to be displayed on the display surface in accordance with the instruction detected;
   detecting that the instruction to move the at least part of the image displayed on a display surface has ceased; and
   changing the at least part of the image having the reduced graduation level to the original graduation level when detecting the instruction to move the at least part of the image has ceased.

11. The information-processing method according to claim 10, further comprising:
   changing the at least part of the image to the at least part of the image having the reduced gradation level by keeping pixels having a minimum value unchanged and changing values of other pixels to a maximum value, or by keeping pixels having a maximum value unchanged and changing values of other pixels to a minimum value.

12. The information-processing method according to claim 10, further comprising:
   changing the at least part of the image to the at least part of the image having the reduced gradation by reducing the gradation level of the at least part of the image to a gradation level according to a ratio of a text area included in the at least part of the image.

13. The information-processing method according to claim 10, further comprising:
   changing the at least part of the image to the at least part of the image having the reduced gradation level by reducing the gradation level of the at least part of the image to a gradation level according to a type of an application that causes the at least part of the image to be displayed.

14. The information-processing method according to claim 10, further comprising:
   changing the at least part of the image to the at least part of the image having the reduced gradation level by binarizing the image based on comparison between values of pixels and a threshold value, the threshold value being a pixel value that has a larger difference from a pixel value of a background image displayed in the background of the at least part of the image from an average, median, or mode pixel value of the at least part of the image, the background image being expressed by only pixels having an identical value.

15. The information-processing method according to claim 10, further comprising:
   changing the image to the at least part of the image having the reduced gradation level that shows a figure of an area in which the at least part of the image is displayed.

16. The information-processing method according to claim 10, further comprising:
   changing the at least part of the image to the at least part of the image having the reduced gradation level that shows a type of the at least part of the image, and to cause the at least part of the image having the reduced gradation level reduced at the first change step to be displayed in an area in which the at least part of the image is displayed.

17. The information-processing method according to claim 10, wherein the moving speed of the at least part of the image is equivalent to the moving speed of movement of touch positions of the instruction on the display screen.

18. The information-processing method according to claim 10, wherein the instruction to move at least part of the image displayed on the display surface includes at least one of scrolling, enlarging, and reducing the at least part of the image.

* * * * *

UNITED STATES PATENT AND TRADEMARK OFFICE
CERTIFICATE OF CORRECTION

PATENT NO. : 11,132,823 B2
APPLICATION NO. : 16/469290
DATED : September 28, 2021
INVENTOR(S) : Takurou Itou Page 1 of 1

It is certified that error appears in the above-identified patent and that said Letters Patent is hereby corrected as shown below:

In the Claims

Column 18, Lines 6, 9, 12, 13, 15, 20, 26, 35, 42, 50, and 62: Replace "graduation" with "gradation".

Column 19, Lines 2, 5, 19, 22, 25, 28, and 34: Replace "graduation" with "gradation".

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*